United States Patent [19]

Griguscheit

[11] Patent Number: 4,772,135
[45] Date of Patent: Sep. 20, 1988

[54] BEARING ARRANGEMENT FOR THE IMPELLERS OF THE COMPRESSOR AND THE TURBINE IN THE TURBINE HOUSING THAT ARE ARRANGED NEXT TO ONE ANOTHER ON A SHAFT OF A ROTOR SHAFT

[75] Inventor: Manfred Griguscheit, Stuttgart, Fed. Rep. of Germany

[73] Assignee: Daimer-Benz Aktiengesellschaft, Stuttgart, Fed. Rep. of Germany

[21] Appl. No.: 75,645

[22] Filed: Jul. 20, 1987

[30] Foreign Application Priority Data

Aug. 23, 1986 [DE] Fed. Rep. of Germany ....... 3628687

[51] Int. Cl.$^4$ ...................... F16C 27/00; F16C 33/58; F04B 17/00
[52] U.S. Cl. ..................................... 384/99; 384/518; 384/535; 417/405
[58] Field of Search ................. 384/99, 535, 536, 517, 384/518, 563, 581, 582; 417/405, 406

[56] References Cited

U.S. PATENT DOCUMENTS

| 3,097,895 | 7/1963 | Matt | 384/535 |
| 4,213,661 | 7/1980 | Marmol | 384/99 |
| 4,337,983 | 7/1982 | Hibner | 384/99 |
| 4,440,456 | 4/1984 | Klusman | 384/99 |
| 4,652,219 | 3/1987 | McEachern, Jr. et al. | 384/518 |

FOREIGN PATENT DOCUMENTS

| 0121670 | 10/1984 | European Pat. Off. |  |
| 0143950 | 10/1984 | European Pat. Off. |  |
| M174821 | 1/1956 | Fed. Rep. of Germany |  |
| 1010335 | 6/1957 | Fed. Rep. of Germany |  |
| 66187 | 10/1971 | Fed. Rep. of Germany |  |
| 3531313 | 3/1986 | Fed. Rep. of Germany | 417/407 |
| 1604879 | 12/1981 | United Kingdom | 384/99 |

Primary Examiner—Stuart S. Levy
Assistant Examiner—Thomas R. Hannon
Attorney, Agent, or Firm—Barnes & Thornburg

[57] ABSTRACT

A bearing arrangement for the impellers of the compressor and the turbine of an exhaust gas turbocharger that are arranged next to one another on a shaft end of a rotor shaft. The rotor shaft, via two roller bearings, is supported in the compressor housing. In order to achieve a vibration-damped bearing, at least one roller bearing is supported in the compressor housing while either enclosing a gap-shaped damping space as the hydraulic cushion or a radially acting spring body.

7 Claims, 4 Drawing Sheets

BEARING ARRANGEMENT FOR THE IMPELLERS OF THE COMPRESSOR AND THE TURBINE IN THE TURBINE HOUSING THAT ARE ARRANGED NEXT TO ONE ANOTHER ON A SHAFT OF A ROTOR SHAFT

BACKGROUND AND SUMMARY OF THE INVENTION

The present invention relates to a bearing arrangement for impellers of a compressor and a turbine of an exhaust gas turbocharger in a compressor housing having a housing bore.

A bearing arrangement of this general type is known from European patent No. 0,121,670. In this known bearing arrangement, the support of the rotor shaft takes place via two ball bearings that are inserted in a housing bore such that, inside the hub that is arranged centrally in the inlet housing of the compressor, the outer races rest directly against the bore wall.

Because of the relatively rigid bearing of the rotor, in the known arrangement, the danger exists that the critical rotational speed of the rotor shaft occurs in the proximity range of the maximum rotational speed of the turbocharger which requires a precise balancing of the impellers with the rotor shaft. Despite careful balancing, higher bearing forces, in the known arrangement, may occur at the ball bearings that can result in premature fatigue or the destruction of the ball bearings.

Although it is possible, by shortening the overall length of the rotor, to shift the critical rotational speed out of the range of the maximum rotational speed, this requires that the impellers be arranged as close together as possible. This results in the overall efficiency of the turbocharger being impaired because of the increased heat transfer from the turbine side to the compressor side.

The known bearing arrangement also has the disadvantage that increases of the rotational speed for achieving a higher compressor pressure ratio result in a decrease of operational reliability. Alternative to increasing the rotational speed, an enlargement of the impeller diameters, while keeping the maximum rotational speed the same, results in an increase of the moment of inertia of the rotor and as a result in a lasting deterioration of the response behavior.

The present invention therefore has an objective of improving the known bearing arrangement in such a way that, with low requirements with respect to the quality of the balancing, a rising of the compressor pressure ratio is achieved with small impellers with low inertia, without increasing the bearing load.

This and other objectives are achieved in the present invention by providing in a bearing arrangement for impellers of a compressor and a turbine of an exhaust gas turbocharger with at least two ball bearings separated a distance from one another, with at least one of the ball bearings being supported in the housing bore and enclosing at least one of a gap-shaped damping space acting as a hydraulic cushioning means and a radially active spring body.

By means of the invention, an elastic and damping support of the rotor shaft and of the impellers mounted on it is achieved in the compressor housing, whereby the critical rotational speed is shifted out of the range of the maximum rotational speed of the turbocharger. In this case, the means that are provided for the damping and the elastic support are influenceable in such a way that, after a raising of the rotational speed limit of the turbocharger, the critical rotational speed will still be outside the range of the new maximum rotational speed of the turbocharger. This has the advantage that an increase of the compressor pressure ratio can be achieved by means of small impellers with low inertia and without any significant increase of the bearing load.

Other objects, advantages and novel features of the present invention will become apparent from the following detailed description of the invention when considered in conjunction with the accompanying drawings.

DETAILED DESCRIPTION OF THE DRAWINGS

Figure 1:
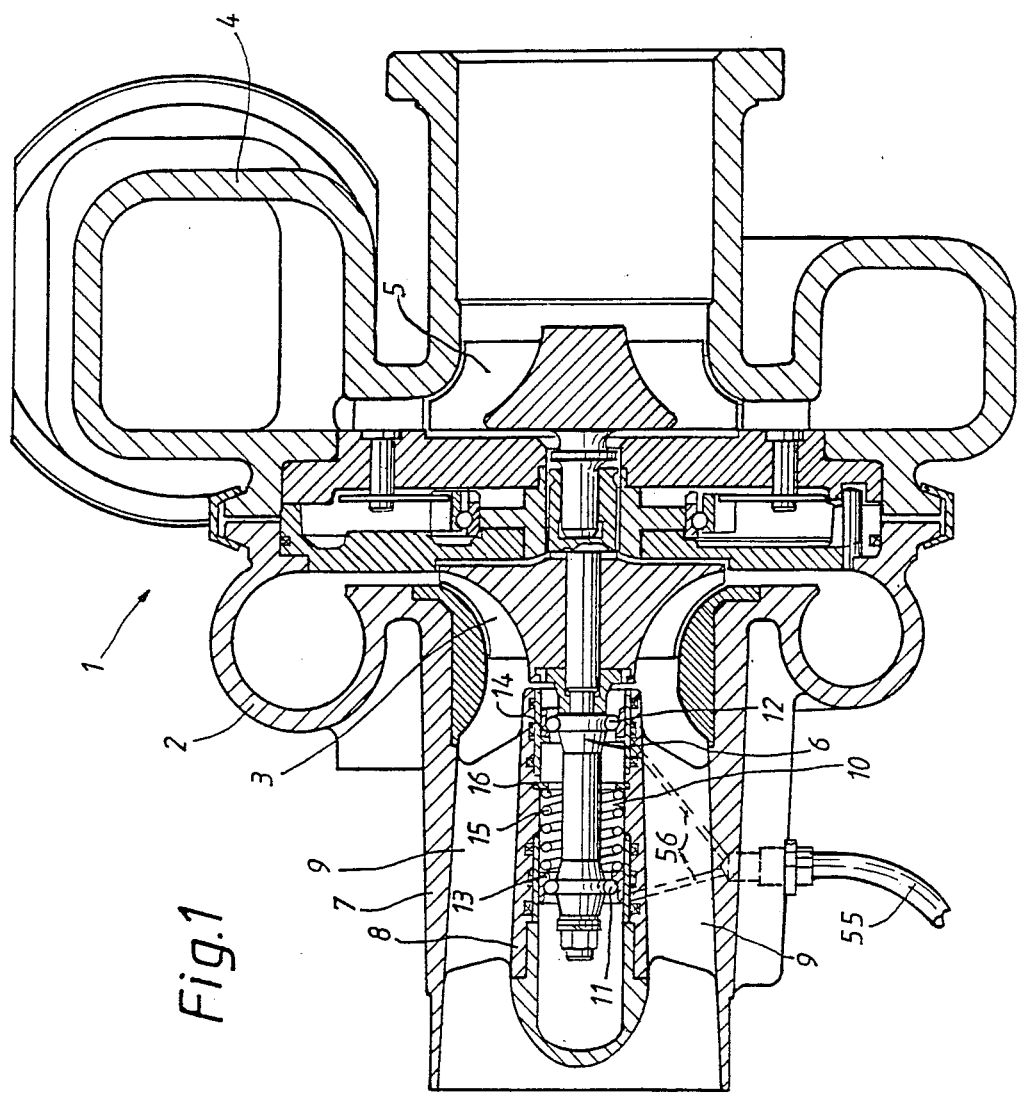
FIG. 1 is a longitudinal sectional view of the bearing arrangement according to a preferred embodiment of the present invention for the rotor shaft of an exhaust gas turbocharger.

As shown in FIG. 1, an exhaust gas turbocharger 1 comprises a compressor housing 2 with a compressor impeller 3 arranged in it, and a turbine housing 4 with a turbine impeller 5 in it that is acted upon by exhaust gas. Both impellers 3 and 5 are fixedly mounted on one end of a rotor shaft 6 that, with its other end, is disposed in a hub 8 that centrally penetrates a housing part 7, on the inlet side, of the compressor housing 2.

The hub 8, by means of ribs 9, is held in housing part 7 and has a house bore 10 in which the rotor shaft 6 is pivotably supported via two ball bearings 11 and 12 that are arranged at a distance from one another. In this case, the outer ball bearing 11 with its outer race 13 that is arranged away from the compressor impeller 3, is held in the housing bore 10 so that it can be slid in axial direction, with the inner ball bearings 12 with its outer race 14 that is closer to the compressor is held stationary in the housing bore 10. By a coil spring 15 arranged between both ball bearings 11 and 12 in the housing bore 10 and supported via a holding ring 16 at the hub 8 and which presses against the outer race 13, the whole rotor shaft 6 is held in its fitting position.

In order to avoid the critical rotational speed of the rotor shaft 6 from adjusting itself in the proximity range of the maximum rotational speed of the turbocharger, the two ball bearings 11 and 12 are held in the housing bore 10 in an elastic and hydraulically damped way.

The same effect is also achieved if only one ball bearings 11 or 12 is hydraulically damped and the other ball bearings is only supported elastically in the housing bore 10.

Figure 2:
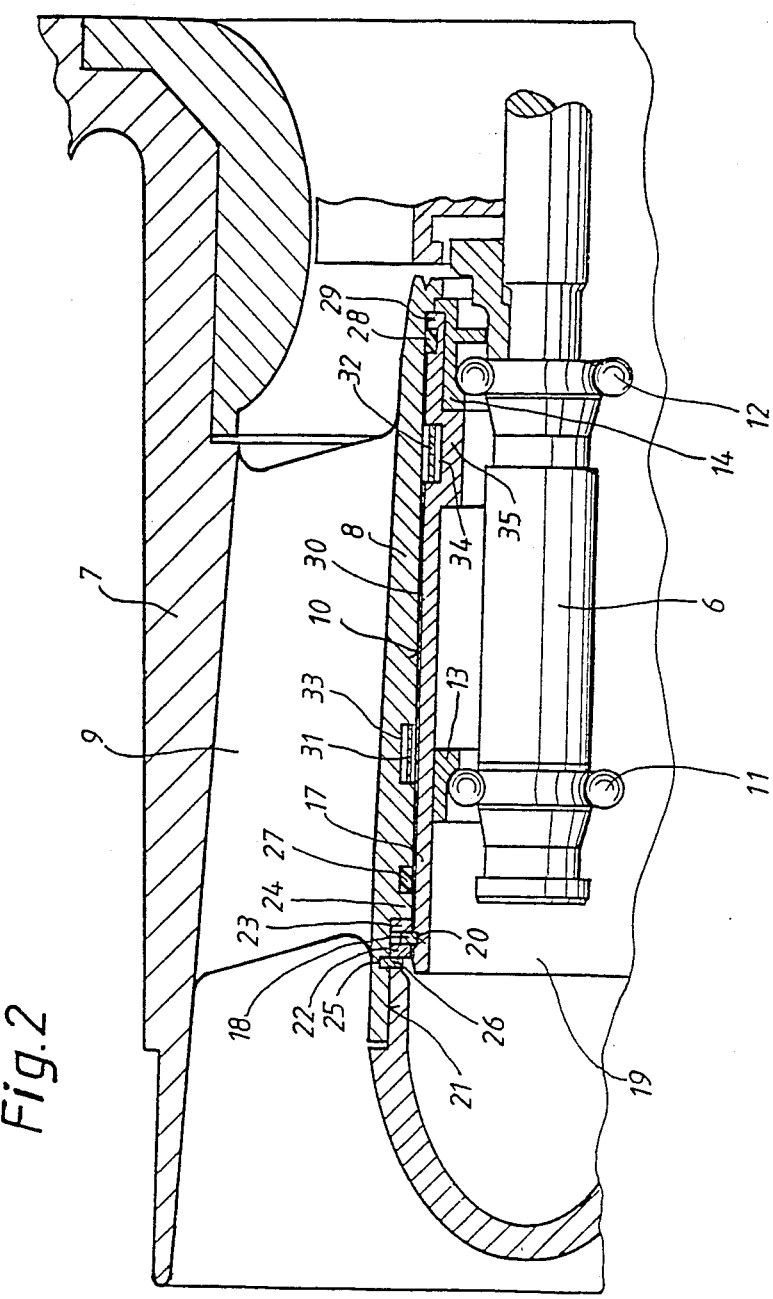
FIG. 2 is an enlarged sectional representation of another embodiment of the bearing arrangement according to the present invention having a bearing shell that receives both ball bearings.

A further preferred embodiment of a bearing arrangement for this type of rotor shaft 6 is shown in detail in FIG. 2. The end of the rotor shaft 6, on the side of the bearing, together with both ball bearings 11 and 12, is held in a joint cylindrical bearing bush 17 that itself, with a large radial play, is inserted inside the housing bore 10 and is fixed in axial direction. The axial fixing means comprises a spring ring 18 that is inserted into a ring groove 20 that is worked from the outside into the end 19 of the bush 17 that is located adjacent to the ball bearings 11. This spring ring 18 is guided between two holding rings 22 and 23 that are placed in an expansion 21 of the housing bore 10. These holding rings 22 and 23 in turn are axially fixed by being placed against a shoulder 24 formed by the expansion 21 and the housing bore 10 and against a spring ring 26 that is arranged inside the expansion 21 in a ring groove 25.

Because of the radial play, a gap-shaped ring space is created between the housing bore 10 and the bearing bush 17. This ring space is sealed off toward the outside by sealing rings 27, 28 in the area of the bush ends 19 and 20 on the longitudinal side. The gap-shaped ring space forms a damping space 30 into which a hydraulic fluid is filled for the damping of vibrations. In parallel to the hydraulic cushion, the bearing bush 17 is elastically supported with respect to the hub 8 via two wavy annular springs 31 and 32 that are arranged in proximity to the two ball bearings 11 and 12. For receiving the annular springs 31 and 32, relatively wide ring grooves 33 and 34 are provided, the ring groove 33 being worked into the hub 8 and the ring groove 34 being worked into a torus 35 of the bearing bush 17 that projects toward the inside. The torus 35 forms a means on which the outer race 14 can rest, this outer race 14 also being fixable between the bush end 29 and the hub 8. The sealing rings 27 and 28 are inserted respectively in a ring groove that is arranged on the side of the hub 8 and a ring groove that is arranged on the side of the bush 17.

Because the bearing bush 17 is supported in the hub 8 only by the wave crests of the annular springs 31 and 32 and the hydraulic cushion of the pressure medium space 30, a bearing arrangement for the rotor shaft 6 is obtained that is flexible and damped with respect to vibrations. By means of this bearing arrangement, when the annular springs 31 and 32 and the damping space 30 are dimensioned correspondingly, the critical rotational speed can be shifted out of the range of the maximum rotational speed of the turbocharger to an uncritical rotational speed range.

Figure 3:
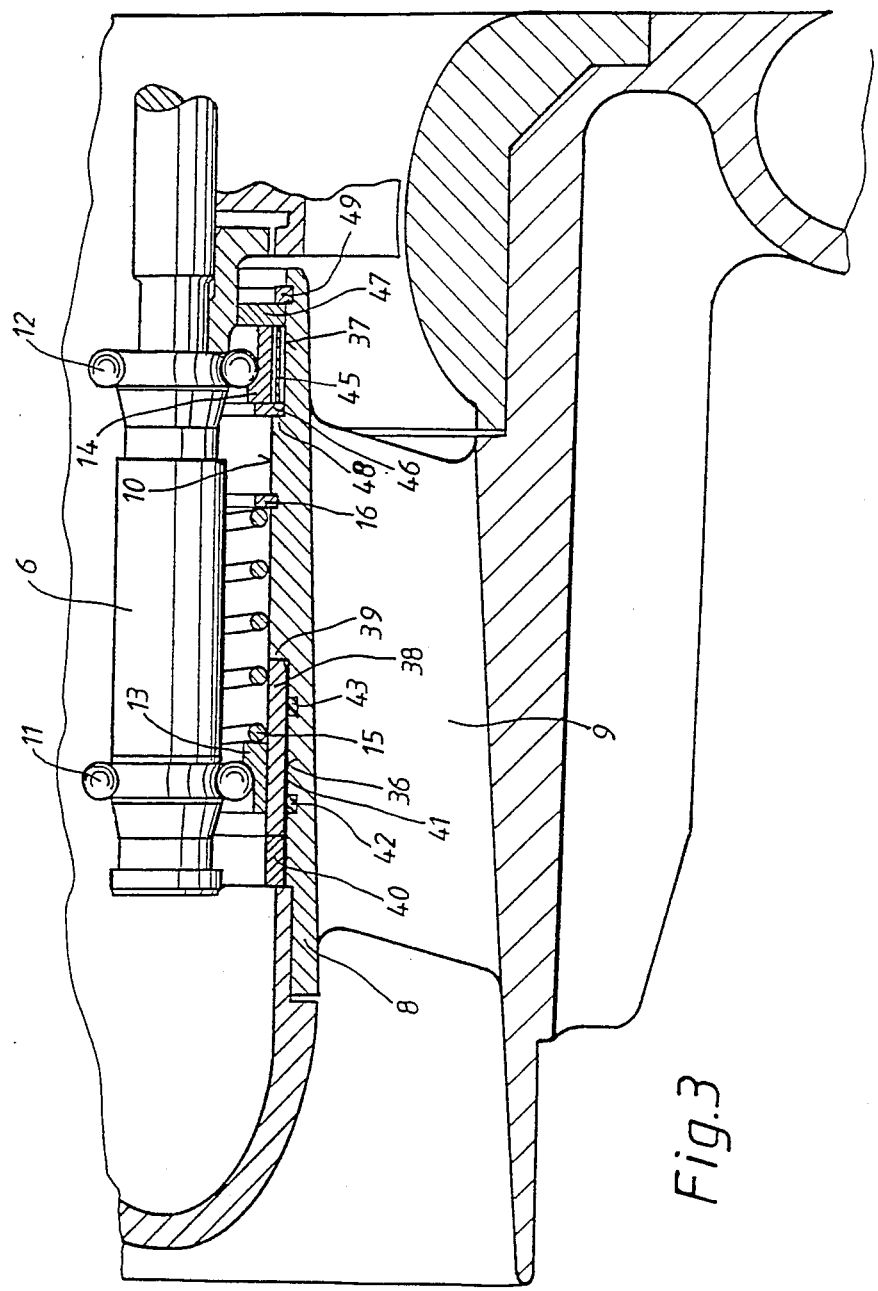
FIG. 3 is an enlarged sectional representation of another embodiment of the bearing arrangement according to the present invention with a hydraulically damped support for the outer ball bearing and an elastic support for the inner ball bearings.

According to the alternate preferred embodiment of FIG. 3, the damping and spring elements of the rotor shaft bearing arrangement are assigned separately from one another to the individual ball bearings 11 and 12. The outer ball bearing 11 is hydraulically damped and the inner ball bearings 12 is elastically supported inside the hub 8. The housing bore 10, in the area of the bearing support, in each case, is provided with a cylindrical enlargement 36 and 37.

In the enlargement 36, a short bearing shell 38 is inserted with large radial play that projects over the width of the outer race 13 on both sides. The bearing shell 38 is held to be axially tight with the exception of a slight play between a housing shoulder 39 and a stop ring 40 that is pressed into the enlargement 36 from the outside (from the left in FIG. 3). The gap-shaped damping space 41 that is formed by the radial play between the bearing shell 38 and the enlargement 36 is sealed off toward the outside by means of sealing rings 42 and 43 that are placed in ring grooves on the side of the hub and is filled with a hydraulic fluid as the damping means.

The elastic support of the inner ball bearings 12 takes place by a wavy annular spring 45 that surrounds the outer race 14 and together with it is held with slight axial play between two stop disks 46 and 47 inside the enlargement 37. For the axially tight holding of the outer race 14, stop disk 46 rests against a housing shoulder 48, and stop disk 47 rests against a spring ring 49 fixed in the hub 8. By means of the separate arrangement of the spring elements and the damping elements at both ball bearings 11 and 12, the same advantages are achieved as for the embodiment of FIG. 2.

Figure 4:
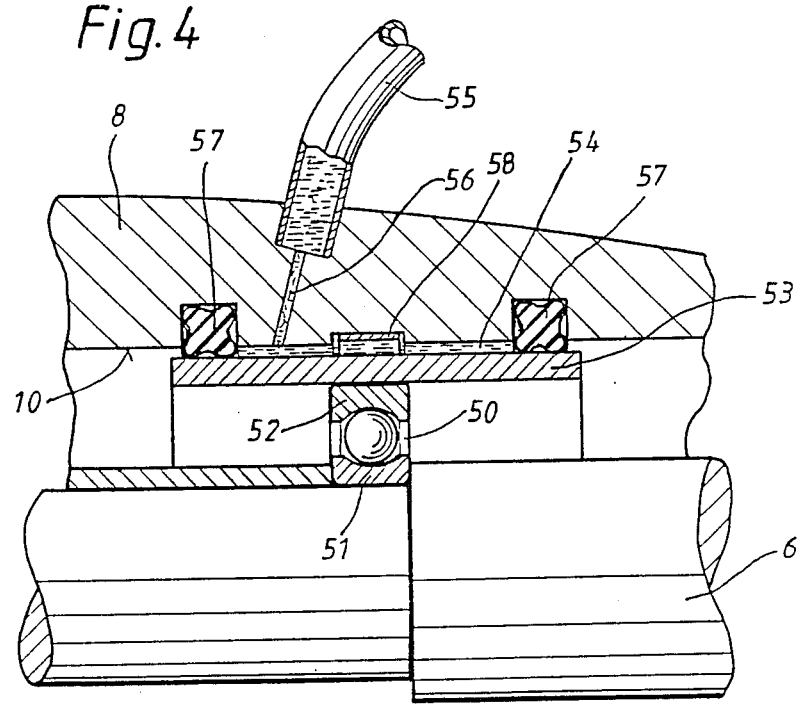
FIGS. 4 and 5 are enlarged sectional representations of two different embodiments of the hydraulic support of FIG. 3.
Figure 5:
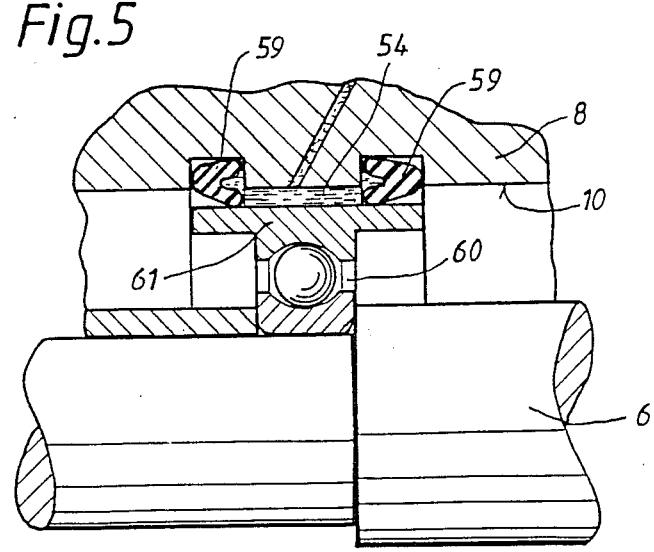

The structural elements of the rotor shaft bearing arrangement according to the present invention that are described in the embodiments of FIGS. 1 to 3 can be recognized better in the enlarged drawings of FIGS. 4 and 5.

As seen in FIG. 4, on the rotor shaft 6, a ball bearings 50 with its inner race 51 is stationarily disposed. With a close sliding fit, a bearing shell 53 is pushed over the outer race 52 of the ball bearings 50, this bearing shell 53 with a large radial play being inserted in the housing bore 10 of the hub 8. Easily recognizable in FIGS. 4 and 5 is the gap-shaped damping space 54 that is formed as a result of the radial play, this damping space 54 being filled with a hydraulic fluid as the damping means. The hydraulic fluid is supplied to the damping space 54 via a supply pipe 55 and a connecting bore 56 in the hub 8. The supply line 55 in this case is connected to a pressure reservoir that is not shown or to a pressure pump, such as the oil pump of the oil circulating system of an internal-combustion engine.

The damping space 54 is sealed off by two sealing rings 57 preferably made of a metallic or an elastomer material. The sealing rings 57, that in this case are in the shape of so-called quad-rings, have a low radial spring rigidity and as a result hardly impair the damping characteristics of the fluid. Parallel to the fluid, the ball bearing 50, via a wavy spring 58 inserted into the damping space 54, is supported with respect to the hub 8 with a certain spring rate. It is contemplated to provide, by the corresponding selection of material and design of the sealing rings 57, that these rings 57 have certain spring characteristics so that the use of the spring ring 58 is not necessary.

Such a contemplated construction is shown, for example, in FIG. 5. The sealing rings 59 that are used for the sealing of the damping space 54 have an approximately V-shaped cross-section. At the same time, these sealing rings 59 have given spring characteristics which as a result make superfluous the use of a separate spring ring. In this case, the sealing rings 59 may also have a different shape than illustrated; for example, that of the sealing rings 57 used in FIG. 4. In order to save overall height, in the ball bearings of FIG. 5, the outer race 1 is at the same time designed as the bearing shell.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A bearing arrangement for impellers of a compressor and a turbine of an exhaust gas turbocharger in a compressor housing having a housing bore, comprising:
at least two rolling bearing means separated a distance from one another with at least one of said rolling bearing means, being supported in said housing bore and enclosing at least one of a gap-shaped damping space acting as a hydraulic cushion means and a radially active spring body;

wherein one said rolling bearing means is an outer rolling bearing means which encloses said damping space, and another said rolling bearing means is an inner rolling bearing means which encloses a wavy annular spring, both said inner and outer rolling bearing means being supported in said housing bore.

2. A bearing arrangement according to claim 1, further comprising: a cylindrical enlargement in said housing bore; a housing shoulder and a stop ring; an outer race for said outer roller bearing means; and a bearing shell that is held axially tight with radial play in said enlargement between said shoulder and said stop ring, whereby said gap-shaped damping space is formed and includes hydraulic fluid, said damping space being sealed by at least two sealing rings; said outer roller bearing means with said outer race being inserted in said bearing shell.

3. A bearing arrangement according to claim 2 wherein said bearing shell and said outer race are an integral component.

4. A bearing arrangement according to claim 3, further comprising supply pipe means for connecting said damping space to at least one of a pressure reservoir and a pressure generating means.

5. A bearing arrangement according to claim 1, further comprising: an outer race for at least one said roller bearing means; stop disks that are fixed at the housing; and a wavy annular spring that concentrically surrounds said outer race; wherein said inner roller bearing means is supported in axial direction in a fixed manner by said stop disks and in radial direction elastically in said housing bore by said wavy annular spring.

6. A bearing arrangement for impellers of a compressor and a turbine of an exhaust gas turbocharger in a compressor housing having a housing bore, comprising:

at least two rolling bearing means separated a distance from one another with at least one of said rolling bearing means, being supported in said housing bore and enclosing at least one of a gap-shaped damping space acting as a hydraulic cushion means and a radially active spring body;

wherein two said rolling bearing means are supported in said housing bore and enclose a damping space and at least one wavy annular spring arranged in area of said damping space; and further comprising a joint bearing bush in which said two rolling bearings are arranged, said bearing bush being inserted into said housing bore with radial play such that said gap-shaped damping space is formed; sealing ring means for sealing off said damping space toward the outside in the area of bush ends on a longitudinal side, said damping space being filled with a hydraulic fluid as the damping means; at least one ring groove in at least one of said housing bore and said bearing bush in which is arranged at least one wavy annular spring, said annular spring having wave crests which rest alternately at a wall of said housing bore and at said bearing bush.

7. A bearing arrangement for impellers of a compressor and a turbine of an exhaust gas turbocharger in a compressor housing having a housing bore, comprising:

at least two rolling bearing means separated a distance from one another with at least one of said rolling bearing means, being supported in said housing bore and enclosing at least one of a gap-shaped damping space acting as a hydraulic cushion means and a radially active spring body;

wherein one said rolling bearing means is an inner rolling bearing means which encloses said damping space, and another said rolling bearing means is an outer rolling bearing means which encloses a wavy annular spring, both said inner and outer rolling bearing means being supported in said housing bore.

* * * * *